United States Patent

[11] 3,554,391

[72] Inventor Harry Goodell
  Bonita, Calif.
[21] Appl. No. 809,254
[22] Filed Mar. 21, 1969
[45] Patented Jan. 12, 1971
[73] Assignee Ro.·r Corporation
  Chula Vista, Calif.
  a corporation of California

[54] ELEVATORS AND ROTATORY STORAGE RACK
  10 Claims, 4 Drawing Figs.
[52] U.S. Cl. .................................. 214/16.4,
  186/1
[51] Int. Cl. .................................. B65g 1/00
[50] Field of Search .......................... 214/16.4,
  16.11, (Inquired), 186

[56] References Cited
  UNITED STATES PATENTS
1,528,893 3/1925 Rother .................. 214/16.1
3,378,151 4/1968 Salloum ................. 214/16.1

FOREIGN PATENTS
408,386 8/1966 Switzerland.

Primary Examiner—Gerald M. Forlenza
Assistant Examiner—Raymond B. Johnson
Attorney—George E. Pearson ABSTRACT: A storage rack having the form of a hollow cylinder is mounted on an annular base for rotation about the vertically disposed longitudinal axis thereof. Shelves of the rack are divided into a plurality of compartments which extend between the inner and outer sides of the rack. A circular platform is moved up or down within the central opening in the aforesaid base and rack by means of a hydraulic ram, and a conveyor line is arranged to convey packaged goods to this platform for transfer to the compartments of the rack from the interior side thereof. The goods are subsequently transferred from the compartments to platforms mounted for vertical movement adjacent the outer sides of the base and rack, and conveyor lines are provided for conveying said goods from the outer platforms to a conveyor line which encircles said base and connects with another conveyor line leading to a loading area.

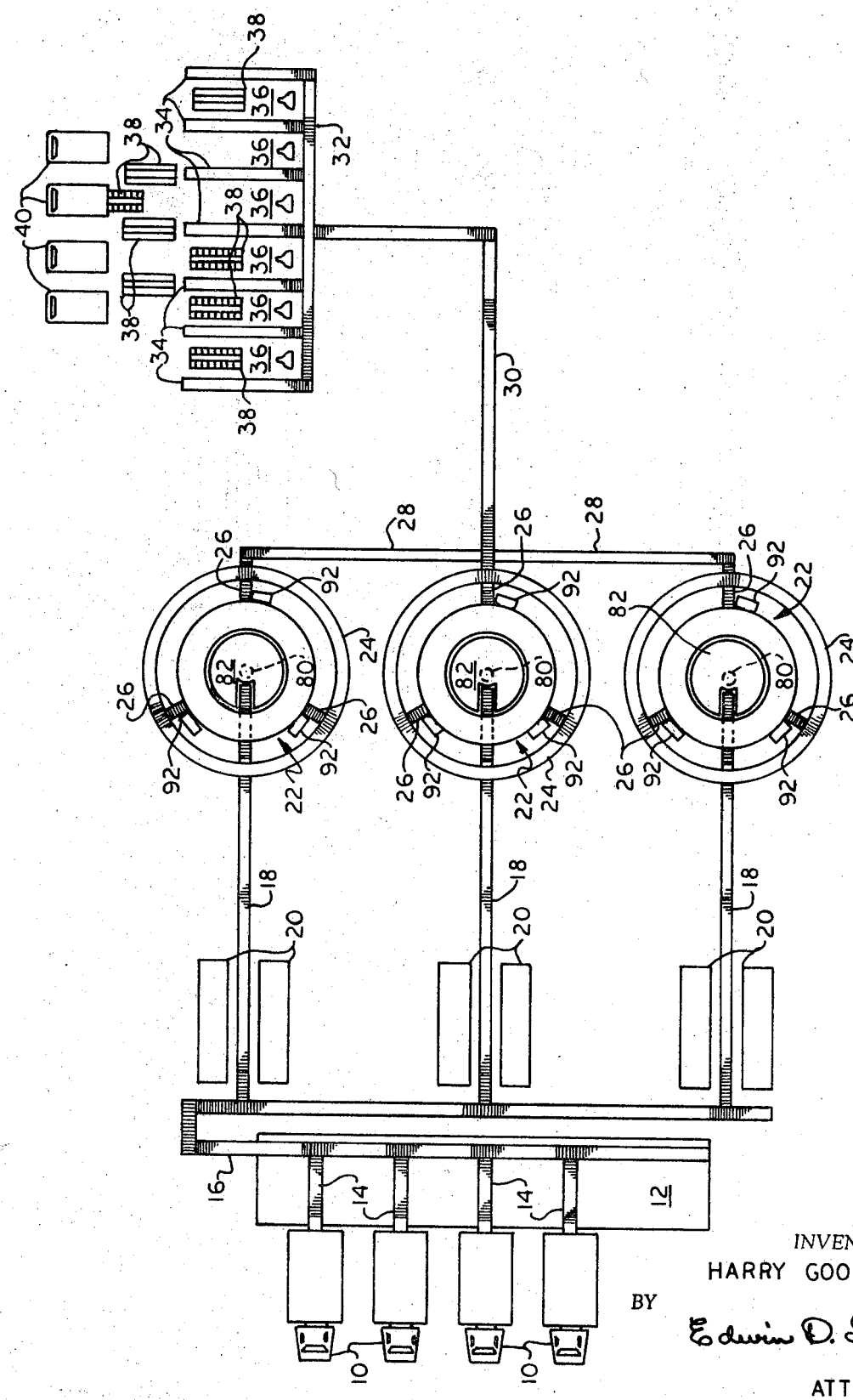

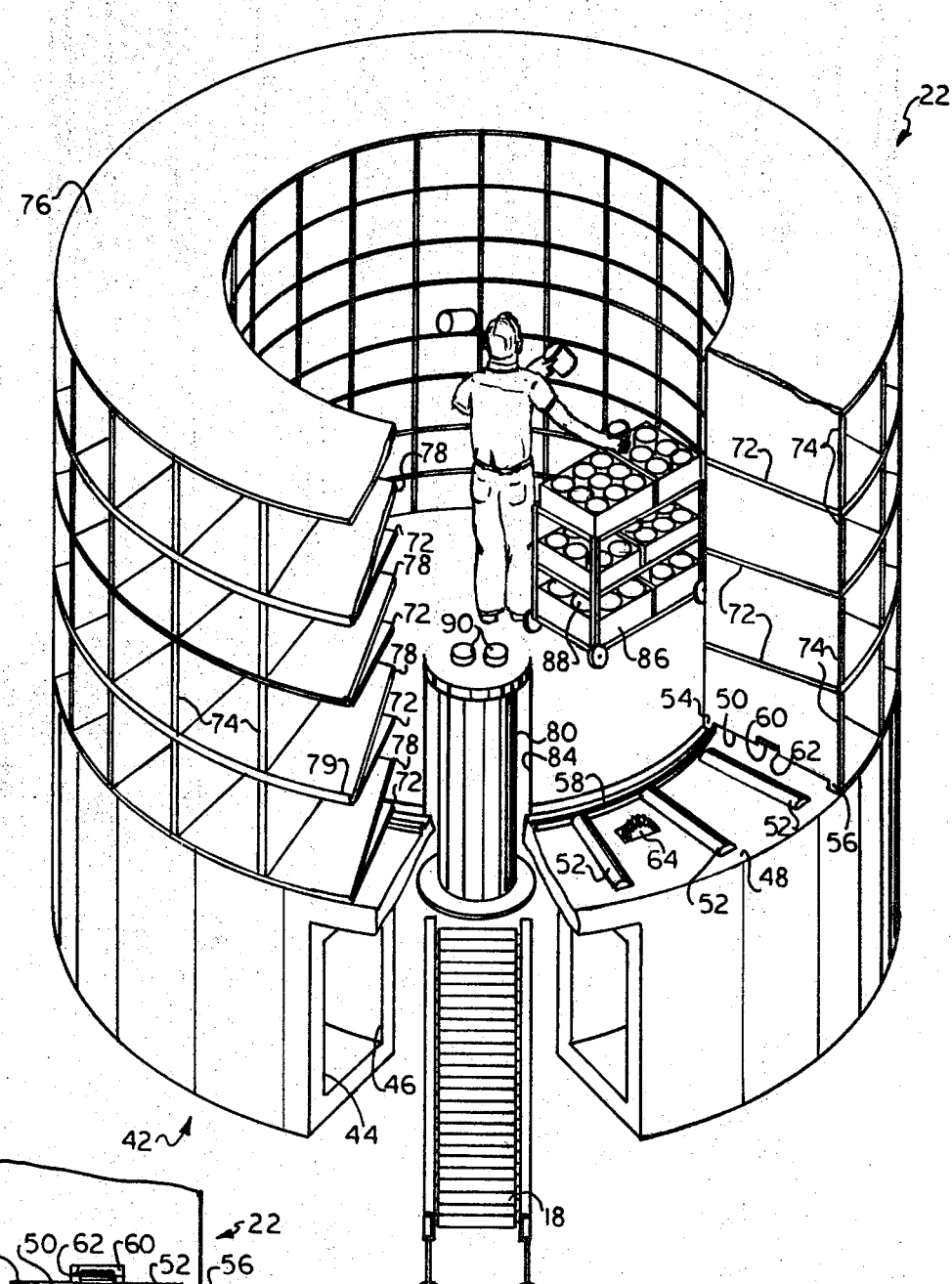

INVENTOR.
HARRY GOODELL
BY
Edwin D. Grant
ATTORNEY

ELEVATORS AND ROTATORY STORAGE RACK

BACKGROUND OF THE INVENTION

This invention relates to materials handling apparatus and, more particularly, to apparatus which facilitates the distribution of household goods such as canned foods and the like.

Although apparatus in accordance with the present invention can be employed in many different materials handling systems, it has particular advantage when used in connection with a recently devised merchandising system that enables persons to place orders for processed foods by telephone and to receive the same within a short time at their homes. One of the components of this new merchandising system is a computer that among other things is adapted to provide instructions to workers concerning the products to be removed from stock at a distribution center for delivery to customers and the routes to be taken by vehicles in order to most expeditiously deliver said products. It is vital to the successful operation of the aforesaid distribution system to minimize the time spent in the selection of particular items from stored merchandise and the transfer of the selected articles to delivery vehicles. The apparatus which is disclosed in the following specification and illustrated in the accompanying drawings provided an effective and economical means for expediting such selection and transfer of goods.

SUMMARY OF THE INVENTION

In a preferred embodiment of this invention goods are moved on conveyor lines from bulk storage areas to a plurality of storage racks each of which has the form of a hollow cylinder and is rotatable by associated drive means at a predetermined angular velocity about the vertically disposed longitudinal axis thereof. The aforesaid conveyor lines respectively extend under the racks to circular platforms respectively mounted on hydraulic rams coaxially positioned within the central openings in said racks. After the goods have been transferred from the conveyor lines to the circular platforms, means associated with the rams are operated by workers on the platforms to thereby move the latter to the level of radially extending compartments in the racks, and the goods are transferred to these compartments. Steel columns are fixedly spaced in vertical, parallel pairs around each rack, and a horizontally disposed platform is mounted on each pair of columns for vertical movement adjacent the exterior side of the associated rack. A conveyor line extends from a point adjacent the lower portion of each pair of the aforesaid support columns to a materials checkout station and thence to a loading platform. Each of the outer platforms is driven along its supporting columns by means of an electric motor and gear arrangement. Workers on the outer platforms can operate the electric motors associated therewith to position themselves at the different levels of compartments in the racks, thus enabling the workers to remove selected goods from said compartments as the latter move past them. Each outer platform has a table fixedly positioned thereon for support of boxes which receive products to be delivered to particular persons. After a worker has loaded the boxes on the platform which he controls, he lowers the platform and the boxes are transferred to the conveyor line which leads to the checkout station and loading platform as aforesaid.

OBJECTS OF THE INVENTION

It is accordingly an object of this invention to provide apparatus useful in the storage and retrieval of large numbers of products such as package and canned foods.

Another object of the invention is to provide apparatus which enables a large number of different products to be conveniently moved into and out of storage units which occupy a relatively small area in a warehouse.

An additional object is to provide apparatus which enables a relatively large number of workers to load materials upon a storage unit and remove the same therefrom without interfering with one another.

DESCRIPTION OF THE DRAWINGS

FIG. 1 is a plan view of three storage racks and associated conveyor lines arranged in accordance with the invention;

FIG. 2 is a pictorial view of a typical one of the three storage racks illustrated in FIG. 1, the drawing also illustrating a base on which the rack is supported and a portion of the rack being cut away so that an inner platform and components can be seen.

FIG. 3 is a detail, partially sectional view of typical components of the aforesaid racks.

Throughout the following specification and the drawings like numbers designate like parts.

DETAILED DESCRIPTION

Figure 4:
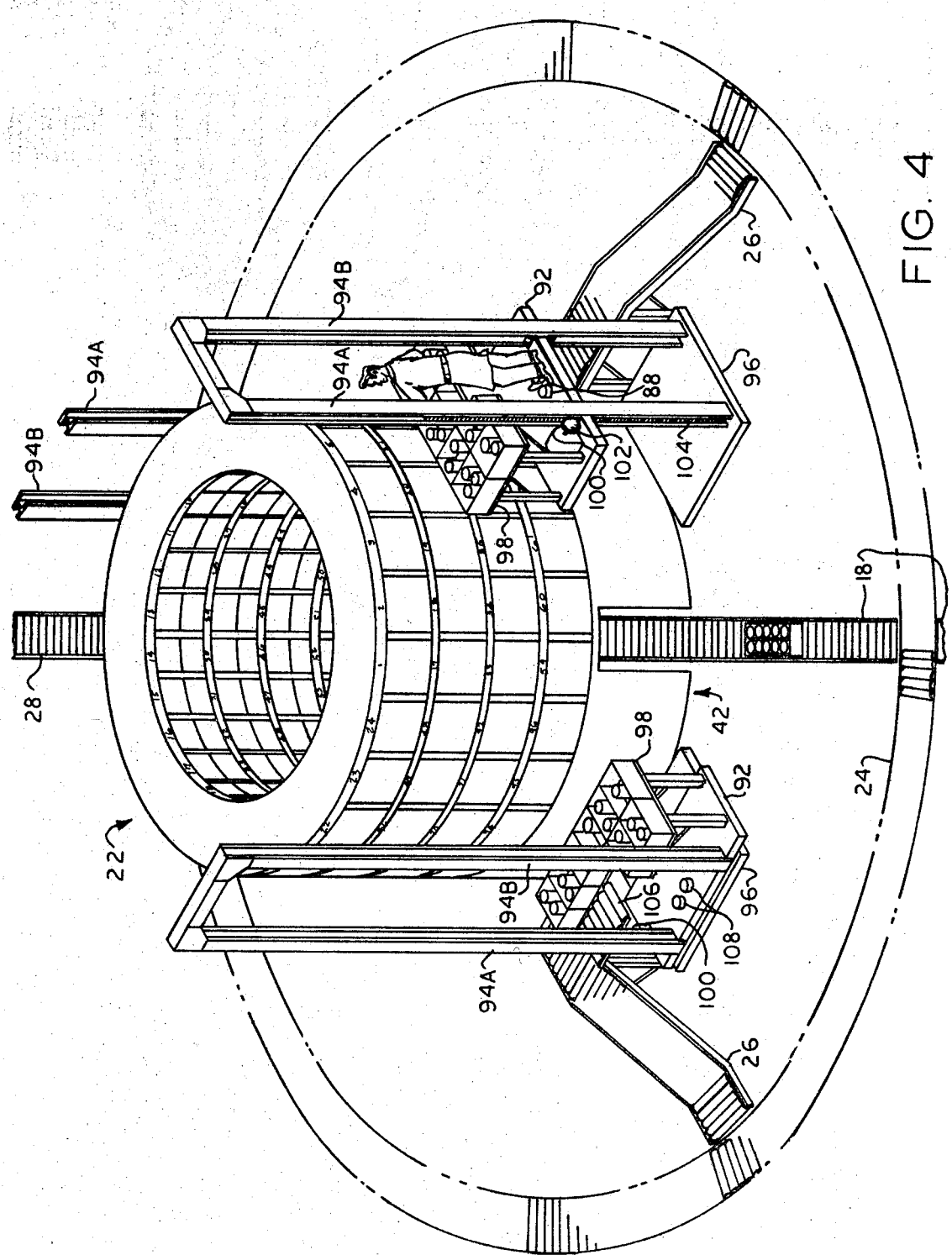
FIG. 4 is a pictorial view of a typical one of the aforesaid racks and the conveyor lines associated therewith.

In FIG. 1 trucks 10 are illustrated adjacent a platform 12 on which spur conveyor lines 14 are mounted. A trunk conveyor line 16 connects spur conveyor lines 14 with three conveyor lines 18 each of which is positioned between a pair of bulk storage racks 20 and extends to a platform which will be described hereinafter and which is associated with one of three identical storage racks generally designated by the number 22. A conveyor line 24 encircles each rack 22 and extends over and is spaced from a respective one of the conveyor lines 18. Spur conveyor lines 26 extend from each conveyor line 24 to points adjacent the rack 22 encircled by the latter, and conveyor lines 28, 30, 32 connect said lines 24 with a plurality of spur conveyor lines 34 which extend along checkout stations 36. Mobile storage racks 38 and delivery trucks 40 are positioned adjacent the checkout stations 36. All conveyor lines are of the roller type.

As illustrated in FIGS. 2 and 3, each rack 22 has the form of a hollow cylinder and is coaxially supported upon an annular base, generally designated by the number 42, which comprises concentrically disposed sidewalls 44, 46 and a horizontally disposed panel 48 which extends between said side walls at the upper edges thereof. One of the conveyor lines 18 extends through radially aligned openings in the side walls 44, 46 of each rack 22 to a point adjacent the common vertically disposed longitudinal axis of said rack and its base 42. Each rack 22 has a horizontally disposed, circumferentially extending support surface 50 at the bottom thereof, which surface abuts a plurality of rollers 52 respectively rotatably mounted in recesses in the upper surface 48 of base 42. More explicitly, the longitudinal axis of each roller 52 is perpendicular to the common longitudinal axis of rack 22 and base 42 and extends radially therefrom. At the inner and outer edges of each rack 22 are circumferentially extending shoulders 54, 56 which depend from support surface 50, and an annular shoulder 58 projects from the upper surface 48 of base 42 and engages the inner side of shoulder 54 to thereby hold rack 22 in coaxial relation with the base 42. A drive rack 60 is fixedly disposed in an annular groove 62 formed in support surface 50, the teeth of this drive rack being spaced from rollers 52. As illustrated in FIG. 3, a pinion gear 64 is mounted on the drive shaft 66 of an electric motor 68 which in turn is mounted on the lower surface of panel 48, the upper portion of said pinion gear projecting through an aperture 70 in said panel and teeth thereof meshing with teeth of drive rack 60. Motor 68 is provided with self-contained speed reduction gears so that it rotates pinion gear 64 slowly when operated and thus also rotates rack 22 about its longitudinal axis at a relatively low angular velocity.

It can be seen in FIG. 2, that rack 22 comprises a plurality of horizontally disposed, annular (i.e., washer-shaped) shelves 72 which are superposed one to another, a plurality of walls 74 extending between and fixedly attached to said shelves 72 and circumferentially spaced apart relative thereto so as to divide rack 22 into a plurality of compartments extending between and accessible from both the inner and outer sides thereof, an annular top member 76 fixedly attached to the upper ends of walls 74, a plurality of shelf panels 78 which are detachably secured to the sides of walls 74, and a plurality of band-shaped stop members 79 which are fixedly secured to the outer edges of shelves 72 and which project upwardly therefrom. Shelf panels 78 are tilted downward toward the outer side of rack 22, and thus cans or the like which are placed thereon from the inner side of said rack slide toward stop members 79. However, in compartments of the rack in which large bags and the like are stored, shelf panels 78 are removed so that the materials can be supported on the horizontally disposed shelves 72. Thus each tier of shelves of rack 22 can be arranged to include both horizontally disposed and tilted sections.

FIG. 2 also illustrates a hydraulic ram 80 which is coaxially disposed within the central opening in each rack 22 and its base 42 and which is movable along its longitudinal axis by a conventional hydraulic drive mechanism (not shown). Mounted on the upper end of each ram 80 is a circular, horizontally disposed platform 82. A slot 84 extends from the rim of platform 82 to a point adjacent the side of ram 80, the width of this slot being slightly greater than the width of the conveyor line 18 which extends into the interior of base 42. Thus platform 82 can be positioned at the level of conveyor line 18 so that boxes 86 of canned foods 88 and the like can readily be transferred from said conveyor line to said platform. The driving mechanism associated with ram 80 is controllable by means of switch buttons 90 mounted on the upper surface of platform 82.

As illustrated in FIGS. 1 and 4, three horizontally disposed platforms 92 are positioned adjacent the outer side of each rack 22 and associated base 42, each platform being mounted for movement longitudinally of a pair of parallel, vertically disposed steel columns 94A, 94B the lower ends of which are fixedly secured to a base 96. Fixedly mounted on each platform 92 is a table 98 and an electric motor 100 provided with self-contained speed reduction gears. The drive shaft of motor 100 carries a pinion gear 102 which engages a gear rack 104 attached to the outer edge of column 94A, so that platform 92 can be moved from a position wherein rollers 106 mounted on table 98 are even with rollers of the adjacent conveyor line 26 (the platform 92 on left hand side of rack 22 in FIG. 4 being illustrated in this position) to elevated positions wherein a worker on the platform is able to remove goods from the shelves of said rack (the platform 92 on the right-hand side of rack 22 in FIG. 4 being illustrated in one elevated position thereof). Motors 100 are operated by means of switch buttons 108 mounted on the upper surface of the platform 92.

OPERATION

One of the important advantages of the described apparatus is that it permits the loading of products into the compartments of racks 22 while the latter are rotating and workers on platforms 92 are removing products from said compartments to fill orders for the same. As will be understood from the foregoing description , this is possible because workers can transfer products from conveyor lines 18 onto platforms 82 while racks 22 are rotating and the drive means associated with hydraulic rams 80 can thereafter be operated to lift said platforms to the levels of compartments of rack 22 which must be replenished with stock. The work of transferring particular products from a platform 92 into particular compartments of the rack 22 associated therewith is quickly and efficiently performed since the platform accommodates a number of workers all of whom can load the same product into a compartment allocated therefor as the rack rotates and said compartment is successively moved past the workers. The loading of goods into compartments of the racks from platforms 92 obviously does not interfere with the removal of the goods from the racks by workers on the outer platforms 92. Each of the last-mentioned workers is provided with lists of the different products which he must remove from rack 22 to fill orders for merchandise, and items selected for a particular order by the worker are placed in one of the boxes supported on rollers 106 of the table 98 of platform 92. After all of the boxes have been filled with products as required, the worker lowers platform 92 to bring the aforesaid rollers 106 even with the rollers of the conveyor line 26 associated with his work station, and the boxes are transferred to said line (with orders attached thereto) and thereafter moved along respective ones of the conveyor lines 26—32 to checkout stations 36 where clerks inspect the products in the boxes to ensure that they are the same items listed on duplicate orders previously forwarded to the checkout stations. After this inspection the loaded boxes are placed on mobile storage racks 38 and the latter are then rolled into the vans of delivery trucks 40, which, as mentioned hereinbefore, then follow computer programmed routes in order to deliver the merchandise carried thereby to different locations in the most expeditious manner. It will thus be seen that the above-stated objects of this invention are fully achieved by means of the apparatus disclosed herein.

Although this invention has been described with reference to a particular embodiment of the same, it should not be considered to be limited thereto for various modifications could be made therein by one having ordinary skill in the art without departing from the spirit and scope of the invention as defined in the following claims.

I claim:

1. Materials handling apparatus comprising a rack formed with a plurality of superposed shelves extending around a central opening in said rack and a plurality of vertically disposed walls respectively attached to said shelves to thereby divide said rack into compartments extending between and accessible from both said central opening therein and the outer side thereof, said rack being rotatable about a substantially vertical axis centrally disposed in said opening therein, a horizontally disposed platform mounted for vertical movement within the opening in said rack, and at least one horizontally disposed platform mounted for vertical movement adjacent the outer side of said rack, whereby workers on said platforms can place goods in said compartments on one side of said rack and remove the same therefrom on the other side of said rack.

2. Apparatus as defined in claim 1 including means for rotating said rack at a predetermined angular velocity about said axis.

3. Apparatus as defined in claim 1 including means for conveying said goods to said platform disposed within the opening in said rack and for conveying said goods from said platform disposed outside said rack.

4. Materials handling apparatus comprising a base having the form of a hollow cylinder the longitudinal axis of which is substantially vertical, a rack formed with a plurality of superposed annular shelves and a plurality of vertically disposed walls respectively attached to said shelves to thereby divide said rack into compartments extending between and accessible from both the inner and outer sides thereof, said rack being coaxially mounted on said base for rotation about the longitudinal axis thereof, a horizontally disposed, circular inner platform mounted for vertical movement within the opening in said rack, and a plurality of horizontally disposed outer platforms mounted for vertical movement adjacent the outer side of said rack, whereby workers on said platforms can place goods in said compartments on one side of said rack and remove the same therefrom on the other side of said rack.

5. Apparatus as defined in claim 4 wherein said inner platform is mounted on the upper end of a vertically disposed hydraulic ram.

6. Apparatus as defined in claim 4 wherein at least some sections of said shelves are tilted downward toward the outer side of said rack and including means associated with said tilted shelves at the outer edges thereof to retain said goods thereon.

7. Apparatus as defined in claim 4 wherein said base has an opening in the side thereof and including a conveyor line extending through said opening for conveying said goods to said inner platform and a plurality of conveyor lines for conveying said goods from respective ones of said outer platform to a conveyor line encircling said base.

8. Apparatus as defined in claim 7 wherein said inner platform has a radially extending slot formed therein and said conveyor line extending through said opening in the side of said base is adapted to fit within said slot when said inner platform is lowered to the level thereof.

9. Apparatus as defined in claim 4 wherein said rack is formed with a horizontally disposed, circumferentially extending support surface at the bottom thereof, a pair of circumferentially extending shoulders respectively depending from said support surface at the inner and outer edges thereof, and an annular groove in said support surface, and including a plurality of rollers spaced apart on the upper surface of said base and each rotatable about an axis substantially perpendicular to the longitudinal axis of said base and extending radially therefrom, said support surface abutting said rollers, a gear rack fixedly disposed in said groove, a pinion gear engaged with said gear rack and rotatable about an axis substantially perpendicular to the longitudinal axis of said base and extending radially therefrom, means mounted on said base for rotating said pinion gear at a predetermined angular velocity, and a circumferentially extending shoulder projecting from the upper side of said base and engaged with the inner side of one of said shoulders on said rack.

10. Apparatus as defined in claim 4 including a table fixedly positioned on each of said outer platforms and a plurality of rollers mounted on each of said tables.